US007721301B2

(12) United States Patent
Wong et al.

(10) Patent No.: US 7,721,301 B2
(45) Date of Patent: May 18, 2010

(54) PROCESSING FILES FROM A MOBILE DEVICE USING VOICE COMMANDS

(75) Inventors: Curtis G. Wong, Medina, WA (US); Eric Norman Badger, Issaquah, WA (US); Steven G. Glenner, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 519 days.

(21) Appl. No.: 11/144,194

(22) Filed: Jun. 2, 2005

(65) Prior Publication Data

US 2006/0235700 A1    Oct. 19, 2006

Related U.S. Application Data

(63) Continuation-in-part of application No. 11/097,719, filed on Mar. 31, 2005.

(60) Provisional application No. 60/675,160, filed on Apr. 26, 2005.

(51) Int. Cl.
G06F 9/44 (2006.01)
H04B 1/38 (2006.01)
G10L 21/00 (2006.01)

(52) U.S. Cl. ............... 719/322; 455/563; 704/275

(58) Field of Classification Search .......... 719/322; 455/414.1, 566, 79, 511, 517, 560, 563; 704/9, 704/270.1, 275
See application file for complete search history.

(56) References Cited

U.S. PATENT DOCUMENTS 5,835,571 A * 11/1998 Johnson ............... 379/88.01
6,393,496 B1 * 5/2002 Schwaderer et al. ........ 719/328
6,584,510 B2 * 6/2003 Anttila ....................... 709/250
6,622,015 B1 * 9/2003 Himmel et al. ........... 455/414.1
6,981,023 B1 * 12/2005 Hamilton et al. ............. 709/206
7,076,431 B2 * 7/2006 Kurganov et al. ........... 704/275
7,505,907 B2 * 3/2009 Carro ........................ 704/270.1
7,536,639 B2 * 5/2009 Griswold et al. ............. 715/234
2002/0010584 A1 * 1/2002 Schultz et al. ............... 704/270
2003/0144034 A1 * 7/2003 Hack et al. .................. 455/566
2005/0043940 A1 * 2/2005 Elder ............................ 704/9
2006/0114338 A1 * 6/2006 Rothschild .............. 348/231.99
2007/0067373 A1 * 3/2007 Higgins et al. .............. 707/206

OTHER PUBLICATIONS

Ahn, Juwon et al, SEREFE: Serendipitous File Exchange Between Users and Devices, Georgia Institute of Technology, 2005. pp. 39-46.*

Chang, Yung-Fu et al, Smart phone—the choice of client platform for mobile commerce, Computer Standards & Interfaces, Nov. 4, 2004. pp. 329-336.*

* cited by examiner

Primary Examiner—Van H Nguyen

(57) ABSTRACT

The presently described subject matter allows the user to interactively browse a collection of electronic files, such as a digital photo collection, remotely using voice activated mobile device. Files from the collection of electronic files can be displayed on the mobile device or they can be directed from the mobile device to be sent to a remote display device, where the file can be displayed. Also, a user can record voice and text annotations and keywords from the mobile device to preserve with an electronic file, and which is transported along with the file when it is displayed.

16 Claims, 6 Drawing Sheets

SPEECH RECOGNITION ON MOBILE DEVICE

PROCESSING FILES FROM A MOBILE DEVICE USING VOICE COMMANDS

RELATED APPLICATIONS

This application claims priority benefit of U.S. Provisional Patent Application No. 60/675,160, filed on May 13, 2005, and is also a continuation-in-part of U.S. patent application Ser. No. 11/097,719, entitled "Processing Files From A Mobile Device" filed on Mar. 31, 2005 by one or more of the present inventors and assigned to Microsoft Corp., the assignee of the present application.

TECHNICAL FIELD

The following description relates generally to voice activated mobile computing devices. More particularly, the following description relates to processing files from a mobile computing device using voice commands.

BACKGROUND

Mobile electronic devices provide many conveniences to users and, therefore, have become increasingly popular. However, such mobile devices contain memory that is limited as a practical matter. This limitation prevents mobile device users from accessing the bulk of their digital files. For example, the convenience and low cost of modern digital photography technology (digital cameras and/or camera phones) has led to a large portion of the public storing hundreds and thousands of digital image files on their personal computers. But it is cumbersome to retrieve digital images (and/or other types of electronic files such as PowerPoint® files) and to share them with others, and impossible if the user is not using the computer directly.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Overview

Figure 1:
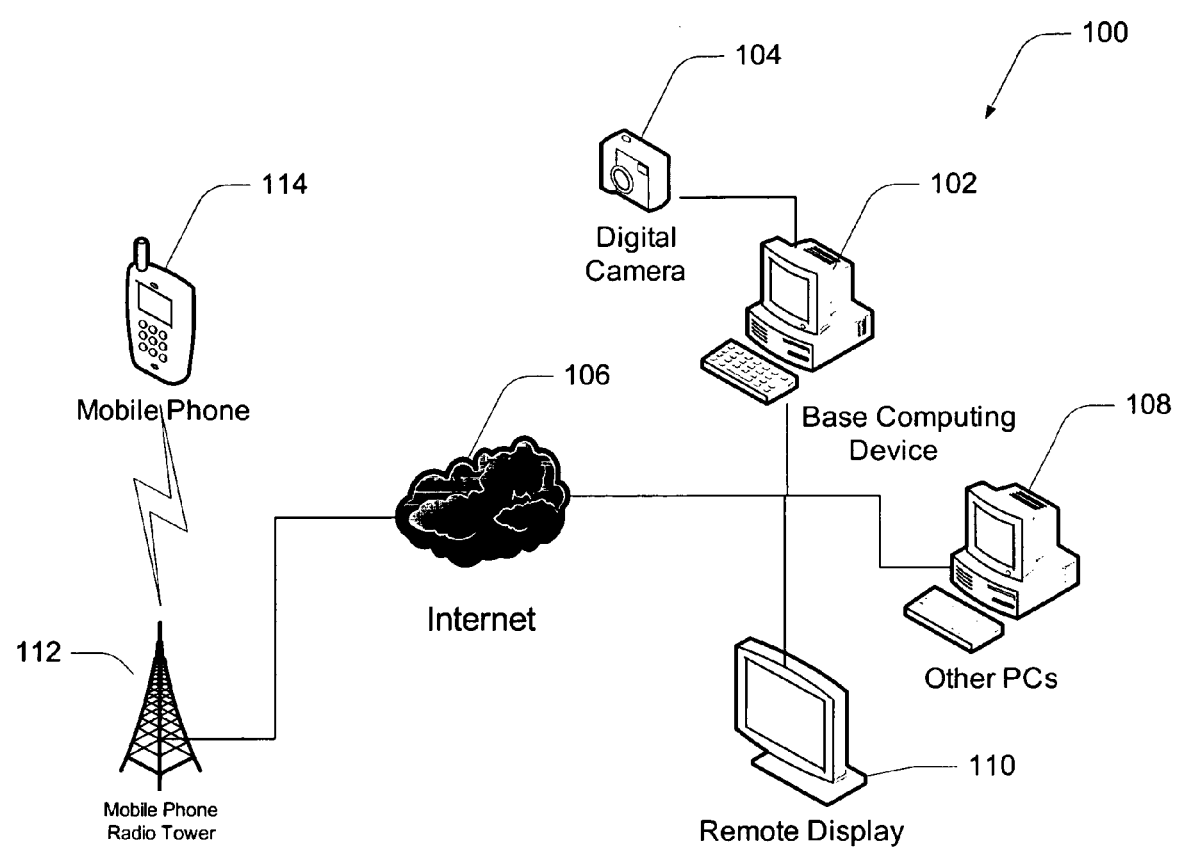
FIG. 1 is a general depiction of an exemplary network system.

The presently described subject matter provides a way for mobile electronic device users to access and manipulate collections of electronic files stored on a computer from their mobile device using voice commands, manual actuations, or a combination thereof. Such files may include any digital image files, video files, electronic presentation files, database files, etc. that a user may wish to have access to but collections of which are too large to be practically available in mobile device memory.

In at least one implementation described herein, a collection of electronic files can be browsed from a remote location using a mobile device, such as a mobile telephone. The files may also be shared with one or more other computers. For example, a user can interactively browse their entire digital photo collection remotely and to share one or more of these photos with another person's computing device, mobile or otherwise. This allows, for instance, a user to access his digital photos from a mobile telephone and display one or more of the photos on a display device at the user's (or at another) location.

In addition, it is currently somewhat cumbersome to associate a voice or text annotation with a particular photo. In one or more implementations described herein, a user can quickly and easily record a voice or use voice command to assign a new keyword or text annotation, or associate a keyword or text annotation from an existing list of keywords for a digital image file from a remote location. The annotation is preserved with the image and is transported along with the image in the event that the image is shared with others or displayed on another display device.

Various systems, methods, computer-readable media, techniques, etc., are described that provide several features, including but not necessarily limited to the following features:

1. Capability to browse a remote collection of photos (or other types of electronic files) interactively, by keyword, date/date range, and by representative thumbnails, on a mobile device such as a telephone;

2. Capability to record and play back voice annotations for items in the remote collection on the phone;

3. Capability to add text annotations to items in the remote collection;

4. Capability to share items in the remote collection with one or more other computing devices;

5. Capability to send items in the remote collection to a different remote display device, either located nearby or at a great distance, in real time;

6. Capability to play back voice annotations for items in the remote collection on different remote display device (other than the mobile phone which is directing the playback);

7. Capability at the computing device that stores the remote collection to intelligently scale the size of the file (i.e. photo) and/or video bit rate and frame rate, or to transcode, or change the video encoding method, for the receiving device to reduce network bandwidth requirements and take full advantage of the capabilities of the mobile device;

8. Capability to use keyword annotations applied to one photo to perform searches for related items in the collection; and 9. Capability to automatically send new pictures or other files created on a mobile device, such as a camera phone, to the base computing device to be included as part of the main collection ("upload capability").

Furthermore, all or most of the features outlined herein may be implemented with voice command functionality so that the features may be activated by a user with voice commands, manual actuations (such as key strokes, mouse inputs, stylus inputs and the like), or a combination of voice commands and manual actuations.

Exemplary Network System

FIG. 1 is a general depiction of an exemplary network system 100. The network system 100 includes a base computing device 102 and a digital camera 104 connected to the base computing device 102. The base computing device 102 is a computing device, such as a personal computer, that includes a mass storage device, such as a hard disk drive (not shown), that is capable of storing a large amount of electronic files.

The base computing device 102 communicates via a network such as the Internet 106 or an intranet to remote systems, such as one or more other PCs 108 and one or more remote displays 110. The base computing device 102 may also communicate with a mobile phone radio tower 112 of a mobile phone system via the Internet 106. In turn, the base computing device 102 communicates with any mobile phone 114 that is configured to communicate with the mobile phone radio tower 112.

Exemplary System Architecture & Methodological Implementation

Figure 2:
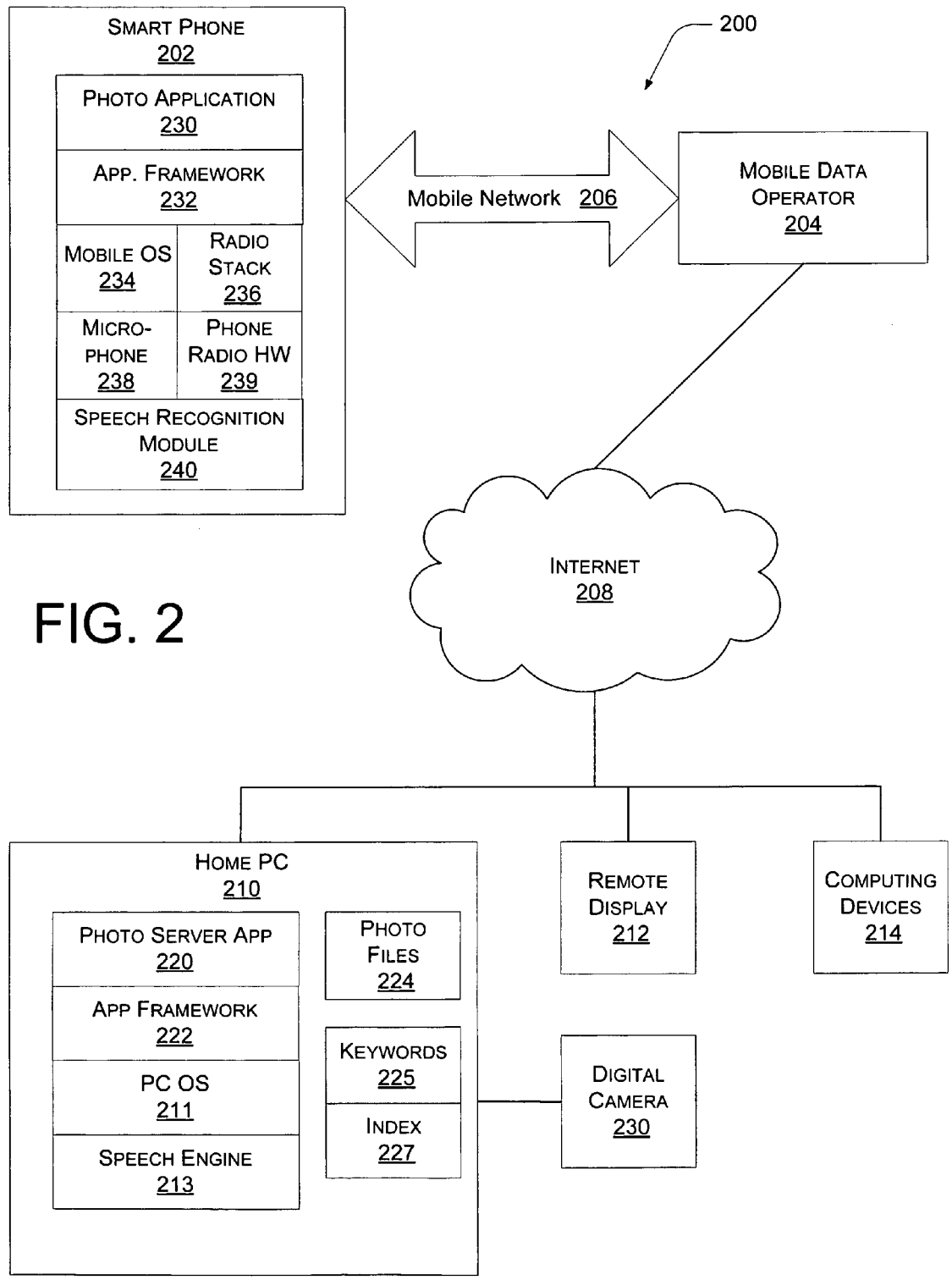
FIG. 2 is a diagram depicting an exemplary system architecture for mobile photo browsing, annotating and sharing.

FIG. 2 is a diagram of an exemplary system architecture 200 in accordance with the present disclosure. The exemplary system architecture 200 includes a smart phone 202 that communicates with a mobile data operator 204 via a mobile network 206. The mobile data operator 204 connects with a network (Internet 208).

A home PC 210 includes an operating system 211 and is configured to communicate with the smart phone 202 via the Internet 208. Although identified as a home PC, the home PC 210 is any computing device that can store a large number of electronic files, such as digital image files, on a mass storage device. One or more peripheral devices, such as a digital camera 212 in the present example, may be connected to the home PC 210. The home PC 210 is also in communication with one or more remote devices via the Internet 208. In the present example, the home PC 210 communicates with a remote display 212 and one or more other computing devices 214.

The home PC 210 also includes a speech recognition engine 213 that is configured to identify voice commands and keywords. Any speech recognition engine known in the art and compatible with the present description may be used as speech recognition engine 213. Speech recognition engines that do not require specific voice training are particularly suitable in this context.

An application 220 runs within an application framework 222 on the home PC 210 and is configured to locate digital photo files 224 stored on the home PC 210. Although one or more examples used herein refer to digital photo files or digital image files, it is noted that the techniques described herein may be used with any other type of electronic file. For example, electronic slide presentation files may be stored on the home PC 210 and manipulated from a mobile device and/or displayed on a remote display.

Figure 3:
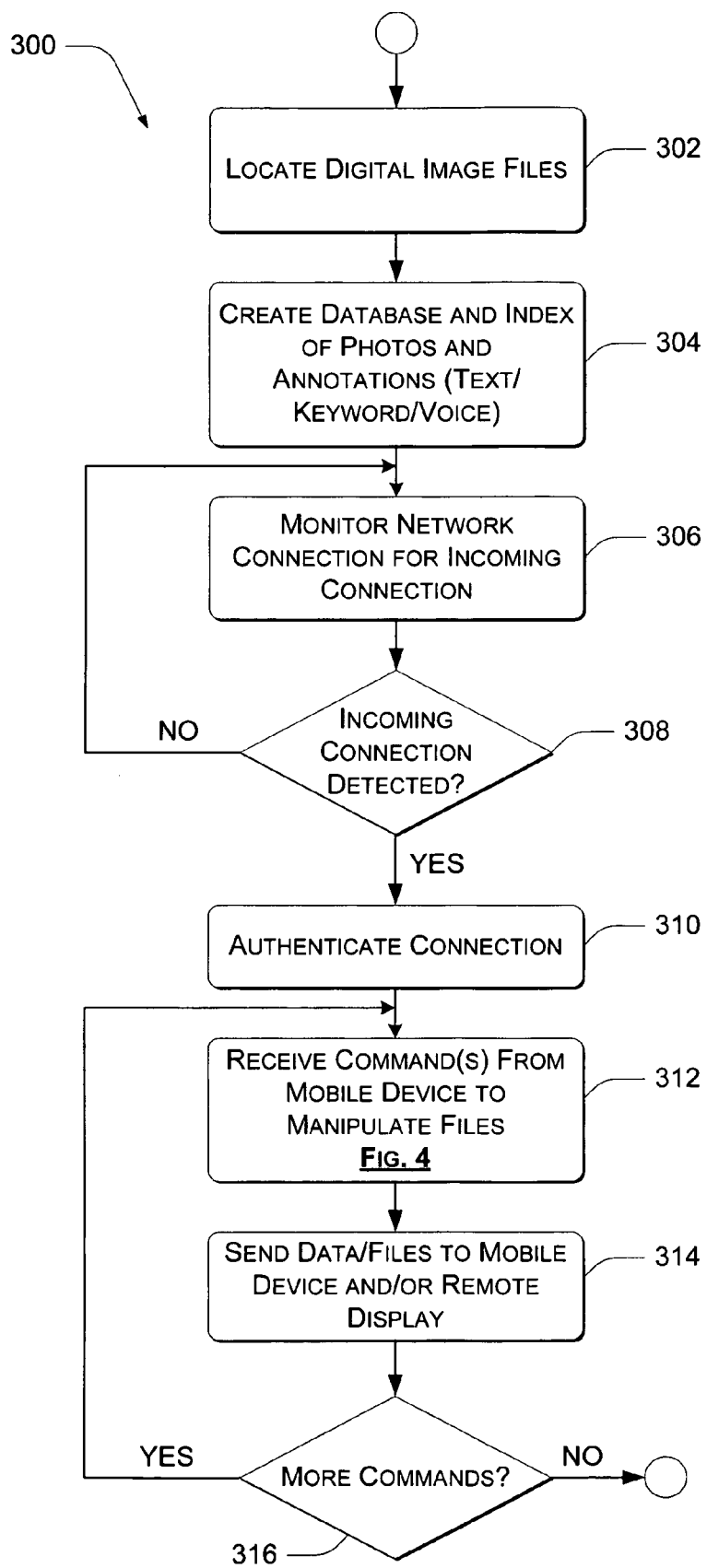
FIG. 3 is a flow diagram depicting an exemplary methodological implementation of processing electronic files from a mobile device.

FIG. 3 is a flow diagram that depicts an exemplary methodological implementation of processing electronic files from a mobile device. In the following discussion, FIG. 2 and FIG. 3 will be concurrently described to discuss exemplary elements/configurations shown in FIG. 2 and exemplary process steps shown in FIG. 3.

At block 302, the application 220 locates the digital photo files 224 stored on the home PC 210. The application 220 creates a keyword database 225 and index 227 of the photos with any associated text/keyword annotations and/or voice annotations (block 304). At block 306, the application 220 listens on the network (Internet 208) for incoming connections over the Internet 208 from the smart phone 202, or other display devices running an appropriate application.

When a device (phone or other PC or display device) connects ("Yes" branch, block 308), the device is authenticated using a password or other method at block 310. As long as no connection is detected ("No" branch, block 308), the application 220 continues to monitor the network connection for incoming connections.

The device (i.e. the smart phone 202) submits one or more commands to the home PC 210 to perform functions such as sending a list of keywords to the device, sending a particular photo to the device, store a voice recording from the device about a particular photo, etc. (block 312).

Figure 4A:
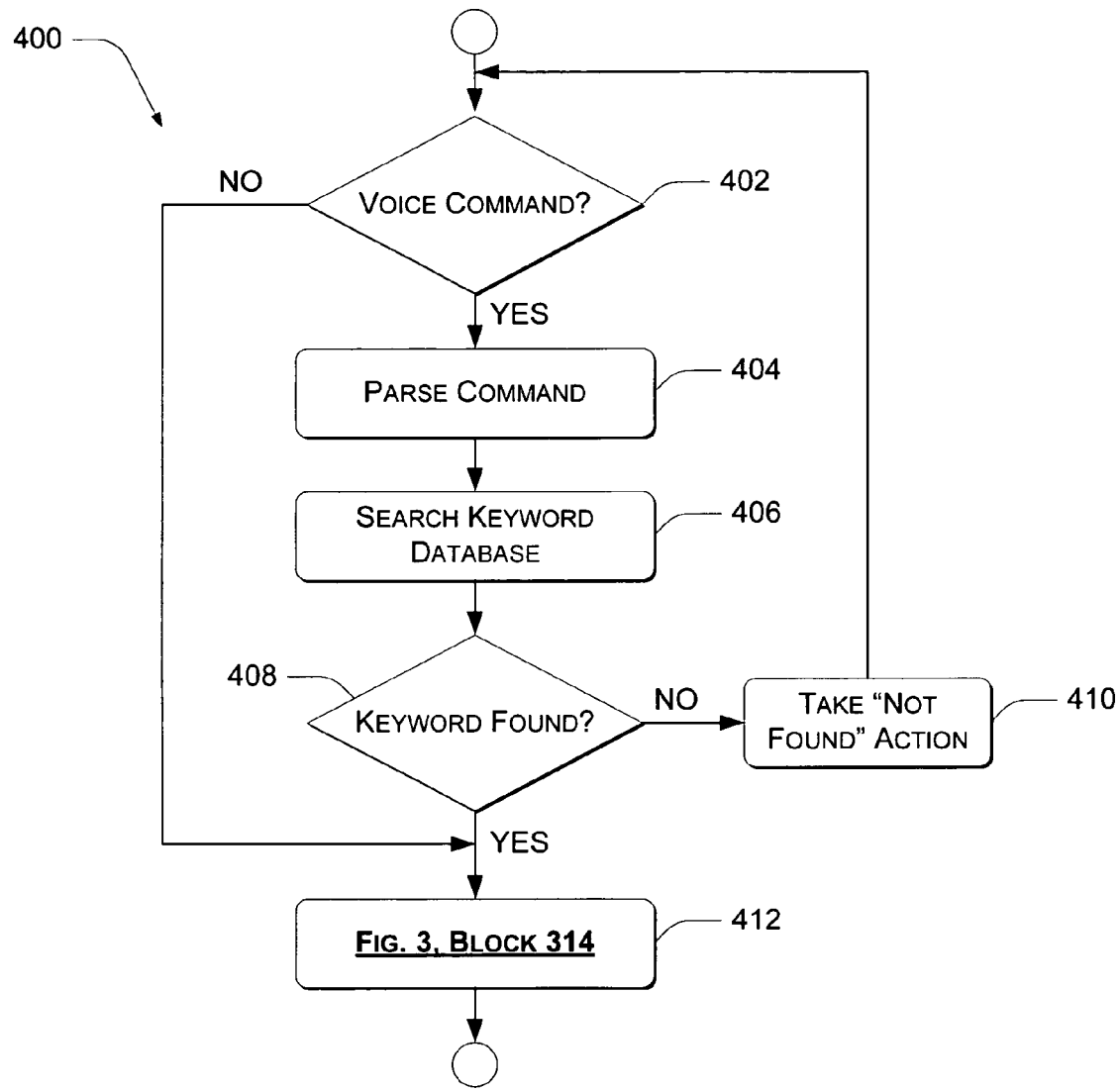
FIG. 4a is a flow diagram depicting an exemplary methodological implementation of voice command processing on a base computing device.

These commands may be voice commands or commands related through one or more manual actuations, such as key strokes, mouse inputs, stylus inputs, etc. FIG. 4a is a flow diagram that provides a more detailed depiction of exemplary command processing performed by the home PC 210. At block 402, the home PC 210 determines if the command is a voice command or a command that has been entered by one or more manual actuations. If the command is not a voice command ("No" branch, block 402), then the process moves to block 412—which is merely a reversion to block 314 of FIG. 3—for further processing.

If the command is a voice command ("Yes" branch, block 402), then the speech engine 213 parses the command at block 404. Typically, the command can include a command word portion and a keyword, which can be a single word or a phrase consisting of several words. If a word appears in the command that is not a command word or is in addition to a command word, the home PC 210—or more specifically, the photo server application 220—searches the keyword database 225 at block 406 in an attempt to identify a match with the parsed command.

If a matching keyword is found ("Yes" branch, block 408), then the command is executed at block 412 (which is, in effect, block 314 of FIG. 3). If no matching keyword is found ("No" branch, block 408), then one or more actions are taken at block 410. Such actions may include, but are not limited to, providing a user error message, requesting a user to repeat the voice command, prompting a user to assign an action for the unrecognized keyword, etc.

Referring back to FIG. 3, at block 314, the home PC 210 executes the commands received at block 312 and transmits data and/or files to the device (or some other device) as required by the received commands.

If more commands are detected ("Yes" branch, block 316), then the process reverts to block 312 where the commands are received and processed. The process terminates if there are no other commands to receive and process ("No" branch, block 316).

It should be noted that a configuration that implements FIG. 4a as described above records a voice command at the mobile device and downloads the voice command to the home PC 210 as an audio note. The home PC 210 then performs the speech to text translation.

In at least one alternative implementation, the smart phone includes a speech recognition module (see speech recognition module 240, below) that identifies a keyword when spoken by a user. In such an alternative implementation, speech translation is performed by the speech recognition module on the mobile device. The mobile device (i.e. smart phone 202) then sends a query request that the home PC 210 fulfills.

Figure 4B:
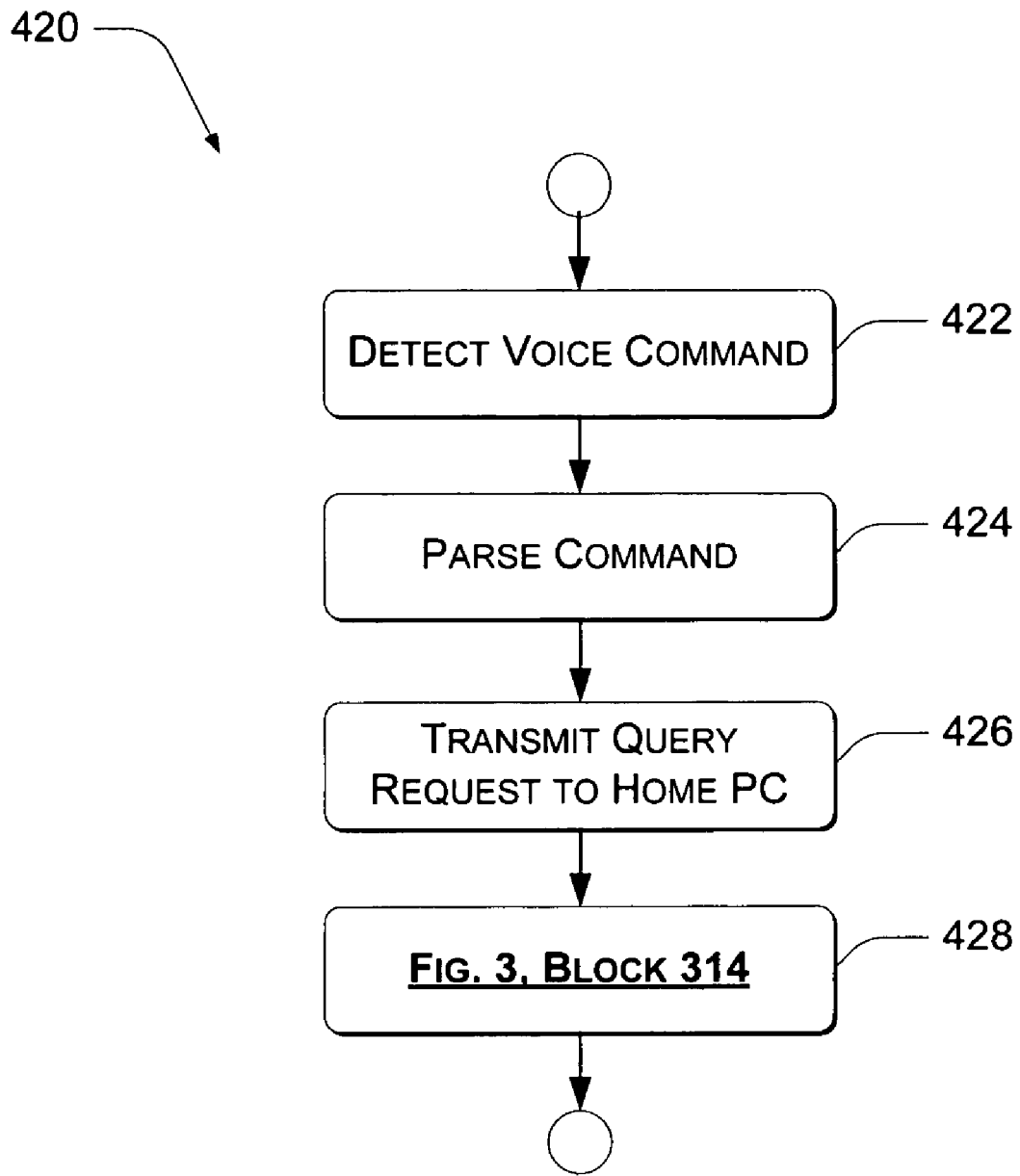
FIG. 4b is a flow diagram depicting an exemplary methodological implementation of voice command processing on a mobile device.

FIG. 4b is a flow diagram 220 that depicts an exemplary command processing technique performed on a mobile device—such as a smart phone or a PDA—that is speech-enabled. At block 422, a voice command is detected by the smart phone 202 and the command is parsed (i.e. a speech to text translation is performed) by the smart phone 202 (block 424).

A query request is transmitted to the home PC 210 at block 426. Typically, this entails the mobile device sending a keyword to the home PC 210 with a command. Since a small text message is all that is required to be transmitted (instead of the voice recording as described in FIG. 4a), the processing is very efficient. The home PC 210 then processes the command received from the mobile device at block 428 (which is block 314 of FIG. 3).

The smart phone 202 includes a photo application 230 within an application framework 232. The smart phone 202 also includes a mobile operating system 234, a radio stack 236, a microphone 238 and miscellaneous phone radio hardware 239. A speech recognition module 240 may also be included in the smart phone 202, either as a hardware module or a software application stored in memory (not shown). As will be described in greater detail below, voice commands may be implemented with or without a speech module situated on the smart phone 202.

The photo application 230 is configured to run on the smart phone 208 which connects (e.g. through a cellular data network (e.g. GPRS)) to the Internet 208, and via the Internet 208 to the home PC 210. The application 230 sends a password to authenticate a smart phone user. Through a user interface (not shown) on the phone, the user can browse through the photo collection 224 stored on the home PC 210.

Browsing Using Voice Commands

Voice commands may be used to enhance the browsing experience and make it more convenient since the small size of mobile devices and typical situations in which they are used can make extensive manual entry of commands difficult at times. Instead of having to actuate keys or a stylus, a user can simply say, for example, "show favorites" to display images included in a favorites list.

Keywords can be a single word or a phrase consisting of several words and can relate to dates, locations, image subject matter or the like. Any word or phrase a user wishes to associate with one or more images may be used. Even arbitrary phrases that don't literally relate to an image may be assigned as an image keyword by a user. Examples of keywords associated with dates include: "March"; "April 2004"; "2002"; "Nov. 26, 1997"; etc. Examples of keywords associated with locations include: "Mount Rainer"; "New York"; "Disneyland"; "Bob's House"; etc. Examples of keywords associated with subject include: "Laura"; "Family"; "Fireworks"; "Museum of Flight"; etc.

Keywords contained in a keyword database may be displayed to a user upon the user making such a request. For example, the phrase "show keywords" may be used to recall a list of all available keywords. In at least one implementation in accordance with the present description, keywords may be represented by one or more representative images.

For example, a keyword "hot air balloon" may be represented visually by an image of a hot air balloon. When keywords are represented by representative images, the text representation of the keyword represented by the image may also be displayed with the image. In the aforementioned example, the text phrase "hot air balloon" may overlay the image of the hot air balloon.

When the set of keywords is displayed, a user may select a keyword in one of several ways. The user may scroll to the keyword of interest and select the keyword. The user may also begin typing the keyword and, as the typing progresses, a keyword is highlighted that matches the typed characters. When the keyword of interest is highlighted, it may be selected by the user. With voice commands enabled, a user may simply speak the keyword of interest to display all images associated with the keyword.

When a user selects a subset of a photo collection by keyword, every image having the keyword associated therewith is displayed. For example, a user may speak the phrase "show hot air balloon" to retrieve all images associated with the keyword "hot air balloon." In addition to the image itself, other data may be displayed in conjunction with the image.

For instance, if the image has a voice annotation associated with it, a voice annotation indicator may be displayed over a small portion of the image. A user can play or modify the voice annotation through manual actuation or voice commands.

Metadata associated with the images may also be displayed. Such metadata may include, but is not limited to, date/time stamp, keywords, directory information and the like. Space, however, may be a limiting factor in such an implementation. In an example where a user has taken a vacation to the Valley of Fire in Nevada in March of 2004, a user may associate keywords "Vacation," "Nevada," "Valley of Fire" and "March 2004" with photographs taken on that vacation. The user may recall these images by speaking a command of, say, "show Nevada" into the smart phone. The images will be recalled and each keyword associated with the images may be displayed with the image.

Note that other images may appear in response to this command. Any image having the keyword "Nevada" associated therewith will be recalled with the vacation photos, even if such images are unrelated to the vacation.

One advantage to displaying all keywords associated with images is that the user may be prompted to continue the search and pivot off of interconnected keywords to wend his way through his photo collection.

For example, a user may speak the phrase "show Disneyland" to recall all images associated with the keyword "Disneyland." While reviewing these images, the user may see a picture of his daughter, Laura, at Disneyland and enter the phrase "show Laura" into the microphone of the smart phone. Images having "Laura" as a keyword will then be displayed. Say that one of these images shows Laura at a family reunion. This might prompt the user to speak the phrase "show family reunion" or "show related" to bring up related photographs from that family reunion.

The "shown related" command is a command that will cause all images sharing common keywords with a selected image or one or more representative images to be displayed. In the above example, wherein the keywords are "Laura" and "family reunion," entering the "show related" command will bring up all image having a keyword of "Laura" and/or a keyword of "family reunion."

In this manner, the user is provided with a way to intelligently browse through his photograph collection without having to put much effort into the process (note that only three commands were spoken/entered in the example given above). When users are provided with this capability, they will be encouraged to annotate photographs more than they are currently so that they will be able to enjoy a richer browsing experience.

Typical use of keywords consists of entering a keyword and receiving search results based on that keyword. In the present implementations, keywords provide much more functionality. In addition to provided limited results to a search on the keyword, each search result (i.e. digital image) includes related information that prompts the user to continue the search on a different axis. This assists the user in recalling occasions and searching further to easily browse through hundreds or thousands of photos.

One or more aspects of the above-mentioned browsing techniques are described in U.S. patent application Ser. No. 10/174,212 entitled "Media Variations Browser" filed on Jun. 18, 2002 and assigned to Microsoft Corp., the assignee of the present invention. Said application is hereby incorporated herein by reference for all that it discloses and teaches.

Remote Display

Additional computing devices (e.g. computing devices 214) and display devices (e.g. remote display 212) can connect via the Internet 208 to the same photo server application 220 on the home PC 210, and can perform some of the retrieval and browsing operations. When a display device 212 is connected to the home PC 210 in such a way, the user can use the smart phone 202 to send (push) a photo directly to the display device 212. In this way, a "slide show" depicting the electronic files can be operated from the smart phone 202, where the viewing takes place on the remote display 212. Since the display device 212 and home PC 210 are connected by the Internet 208, there is no requirement that the home PC 210, the smart phone 202 and/or the display device 212 be in proximity of each other. In fact, it is expected that a common usage scenario will be for a user to direct the slide show where the display device 212 is in another location entirely, perhaps at the remote end of a long-distance phone call in which the user of the smart phone 202 is participating.

Resolution Issues

The photo server application 220 on the home PC 210 uses information about a display (either a smart phone 202 display (not shown)) or other display device 212, 214 to appropriately scale the size and quality of the photo to make best use of the network used for transmission. For example, if the smart phone 202 has a display size of 176×220, the application 220 scales down each photo to that size and uses an image compression mechanism with an image quality parameter to reduce the size in bytes of the transmitted image data to only a few kilobytes which can be transmitted in just a few seconds via the GPRS network. For a larger display device such as a laptop computer, the image is pre-scaled to the size of the laptop's display panel, and compressed to take advantage of the faster broadband internet connection.

In addition, the photo server application 220 is configured to resize an image and adjust resolution for an image when the application 220 receives image zooming data. For example, a user may wish to zoom in on a portion of an image on the smart phone 202. The user does this in the manner provided for by the particular type of smart phone 202 being used.

When the image is zoomed in on, the display resolution will not be ideal and the image immediately displayed on the smart phone 202 will appear blurry. But when the home PC 210 receives the data related to the zoom procedure, the application 220 will adjust the resolution to a proper resolution of the new image formed from the original image. The new image is transmitted to the smart phone 202 where it is displayed at the proper resolution.

Smart Phone Functionality

Several functions are provided from the smart phone 202. The functions include, but are not limited to:

(1) Performing keyword searches on the photo database;

(2) Looking at the photos in a search result list;

(3) Retrieving and viewing the keywords and metadata for photos;

(4) Easily run related queries for keywords attached to a photo;

(5) Retrieving voice annotations stored with a photo;

(6) Recording new voice annotations for a photo and sending them to the remote database;

(7) Zooming into a portion of a photo (the zooming is done at the server and only the zoomed portion is sent over the network, again using the intelligent scaling and compression to reduce transmission time and bandwidth used);

(8) Viewing an index of thumbnails of either the current query result set, or of thumbnails representing the keywords which can be searched;

(9) Emailing a photo to a contact stored in the phone, or an email address entered using the phone keypad—the phone instructs the home PC 210 to actually send the email with the full or partial image which is a better use of bandwidth than transmitting the larger photo over the GPRS network—the email can optionally include a voice annotation and a text message entered on the phone;

(10) Submitting the photo for printing by a digital printing service and mailing the finished print to the user or to the address stored in a contact on the phone; and

(11) Performing date-based queries to locate items in the collection.

Most or all of the above features may be implemented in a configuration that allows the use of voice commands to carry out the functionality. For example, keyword searches (see paragraph (1) above) can be executed by speaking a keyword (usually together with a command word) into the smart phone 202 microphone 238. In such a configuration, a response to a user speaking the phrase "Show Disneyland" into the microphone 238 will cause all images associated with a keyword "Disneyland" to be displayed.

Remote Photo Browser Protocol

Following is a description of remote photo browser protocol—a network protocol that may be used to implement one or more features described herein. The Remote Photo Browser Protocol (RPBP) is a connection-oriented protocol designed to facilitate browsing of photos and related items and metadata between a server and client device. The protocol is optimized for bandwidth constrained networks, and includes negotiation features to facilitate additional bandwidth savings.

RPBP is essentially a request-response binary protocol, although the requests and responses are decoupled to a very high extent—requests are sent asynchronously and responses are processed asynchronously. In some situations, clients will receive unsolicited responses. Responses will in many cases contain an identifier corresponding to a particular request, but this is not true in all cases. In this sense, it behaves somewhat like a stream-oriented protocol, but with the characteristics of datagrams.

The basic unit of both request and response transactions is a Package—either a Request Package or a Response Package. Both types of packages have a header, followed by an optional payload. The header is fixed size, and the payload will contain a variable amount of data (data length indicated in the header).

For request packages, the payload will contain 1 or more request parameters, such as a search string, a date range, etc. A request parameter may also be an array of bytes, such as wav data for an audio voice annotation.

For response packages, the payload will contain 1 or more Response Elements. Response elements are things like a jpg data stream, a photo data structure, an array of strings, a byte array of audio data etc.

It is possible that certain individual requests will result in multiple response packages being sent—for example searching for images will typically result in multiple found items, so in this case a group of response packages will be sent, 1 for each matching response, to allow the client to progressively display the thumbnails. The final response package will have a "Final" bit set in its flags header field to indicate to the client that no further data will be coming (for that request).

Clients should be able to process unsolicited responses, to allow a PC or other device to push un-requested data to a third device, for example remotely driving a slideshow at a distance.

Authentication

Authentication is performed in a secure manner by using a program such as Windows CryptoAPI. The specific method includes:

On the client and server, the user enters a plaintext password. This password is not persisted.

An MD5 hash of the password is obtained through the Microsoft Enhanced Cryptographic Provider. This hash is converted to a 32-character ascii representation and persisted.

When a client connects to the server, the first Request Package must be an authentication request. This request has 2 parameters—a userid and an authentication hash. The authentication hash is then computed according to the following method:

1. Retrieve the MD5 hash of the password which was previously computed.
2. Retrieve the current UTC date and time in the format: 2000-08-17 23:32:32Z
3. append the first 15 characters of this time string to the hash from step 1. (this gives a timestamp with 10 minutes of precision)
4. compute MD5 hash of the string from step 3.
5. represent the hash from step 4 as a 32-character long ascii string.

The server performs an identical operation with it's locally stored password hash for the offered userid, with the addition of performing the computation listed above for the current time, as well as current time +/−5 minutes to account for the clock being offset between client and server by up to 5 minutes.

The server compares the offered hash to the 3 computed local hashes, and at least 1 of them must match to successfully authenticate. If the offered hash does not match any of the three computed local hashes, then:

1. geometrically increasing delay is introduced, starting at 1000 ms with a progression of ×3.
2. a "failed authentication" response is sent
3. the socket is forcibly disconnected.

If authentication is successful, then an authentication success response is sent, including a collection information response element (see response protocol description).

This authentication mechanism has the following strengths:

Brute force keyspace search attack is impractical due to the strength of the MD5 hash function and the geometric progression of the delay on a failed attempt.

Dictionary attack is impractical due to the progressive delay.

The offered hash is only valid for 10 minutes, so even if it is captured with a network traffic analyzer (packet sniffer) the captured hash quickly becomes invalid. The captured hash cannot practically be reversed into the components (original password hash and timestamp).

Plaintext passwords are not stored on the server or device.

Request Protocol Description

Each communication from the client to the server is in the form of a Request Package. This package contains a fixed-length header, followed by an optional payload.

Request Package Header Structure

| Byte # | Length (bytes) | Data |
|---|---|---|
| 0 | 4 | Request package length (bytes) |
| 4 | 4 | HeaderID (0x000f0d05) |
| 8 | 4 | Payload length (bytes) |
| 12 | 4 | SequenceID |
| 16 | 8 | Request Timestamp (utc filetime) |
| 24 | 1 | Command Code |
| 25 | 1 | Parameter count |

HeaderID is the same for every request sent, and is used by the server to identify the start of a valid Request Package.

The SequenceID should be unique for each new request sent—the server does not process this data, but it is used in the Response Package(s) to allow the client to pair requests and responses.

Some types of requests do not contain a payload, such as keepalive and disconnect.

Command Codes:

| | |
|---|---|
| 0 | Authenticate |
| 1 | Disconnect |
| 2 | SetSize |
| 3 | GetItem |
| 4 | GetItemByID |
| 5 | FindItems |
| 6 | GetKeywords |
| 7 | AddVoice |
| 8 | GetVoice |
| 9 | AddText |
| 10 | Refresh |
| 11 | GetInfo |
| 12 | GetIndex |
| 13 | BrowseByThumbnails |
| 14 | GetZoomedImage |
| 15 | SendToDisplay |
| 16 | GetDisplayList |
| 17 | EmailItem |
| 18 | SetName |
| 19 | SetKeywordThumbnail |
| 20 | BrowseByMonth |
| 21 | KeepAlive |
| 22 | UploadFile |
| 23 | GetThumbnail |
| 24 | PlayVideo |
| 25 | GetUserList |
| 26 | CreateUser |
| 27 | DeleteUser |
| 28 | SetUserPassword |
| 29 | GetUserPermissions |
| 30 | SetUserPermissions |
| 31 | SendInvitation |
| 32 | RemoveKeyword |

The payload portion of a request package contains 1 or more Request Parameters.

Request Parameter Types

| TypeID | Type |
|---|---|
| 0 | Int32 |
| 1 | Int64 |
| 2 | Float |
| 3 | Double |
| 4 | Bool |
| 5 | String |
| 6 | ByteArray |

Request Parameter Wire Format:

| Byte # | Length (bytes) | Data |
|---|---|---|
| 0 | 1 | Parameter TypeID |
| 1 | 4 | Parameter data length |
| 5 | varies | Parameter data |

Request Parameter Definitions for Command Codes
Command Code: 0 Authenticate
Parameter count: 2

| Parameter # | Data Type | Data |
|---|---|---|
| 0 | String | UserID |
| 1 | String | Authentication Hash |

Expected Response Package Elements:
CollectionInfoElement
Command Code: 1 Disconnect
Parameter count: 0
Expected Response Package Elements:
none
Command Code: 2 SetSize
Parameter count: 7

| Parameter # | Data Type | Data |
|---|---|---|
| 0 | Int32 | Client Display Width |
| 1 | Int32 | Client Display Height |
| 2 | Int32 | Image Compression Quality (0-100) |
| 3 | Int32 | Thumbnail Width |
| 4 | Int32 | Thumbnail Height |
| 5 | Int32 | Thumbnail Compression Quality (0-100) |
| 6 | Bool | Auto-rotation flag |

Expected Response Package elements:
none
Command Code: 3 GetItem
Parameter count: 1

| Parameter # | Data Type | Data |
|---|---|---|
| 0 | Int32 | Index # of item to retrieve in current result set |

Expected Response Package elements:
PhotoDataElement
PictureElement
MDIList (metadata for this element)
NavigationDataElement
Command Code: 4 GetItemByID
Parameter count: 1

| Parameter # | Data Type | Data |
|---|---|---|
| 0 | Int32 | PhotoID |

Expected Response Package elements:
PhotoDataElement
PictureElement
MDIList (metadata for this element)
Command Code: 5 Finditems
Parameter count: 2 or more depending on find type

| Parameter # | Data Type | Data |
|---|---|---|
| 0 | String | Find Type (Keyword, DateRange, MonthYear, Untagged, Videos) |
| 1 | Int32 | # of items to return per page |
| Find type: Keyword | | |
| 2 | String | Keyword |
| Find type: DateRange | | |
| 2 | Int64 | Begin date (long UTC filetime) |
| 3 | Int64 | End date (long UTC filetime) |
| Find type: MonthYear | | |
| 2 | String | Month/year (e.g. "03/2004") |
| Find type: Untagged | | |
| Find type: Videos | | |

Expected Response Package elements:
First package: IndexInfoElement
$2^{nd}$-$n^{th}$ package: IndexitemElement (n=lesser of (# of items per page requested or size of result set))
Final package will contain "FinalSegment" flag set
Command Code: 6 GetKeywords
Parameter count: 0
Expected Response Package elements:
MDIList (all keywords)
Command Code: 7 AddVoice
Parameter count: 2

| Parameter # | Data Type | Data |
|---|---|---|
| 0 | Int32 | PhotoID |
| 1 | Byte array | Audio wav data |

Expected Response Package elements:
None
Command Code: 8 GetVoice
Parameter count: 1

| Parameter # | Data Type | Data |
|---|---|---|
| 0 | Int32 | PhotoID |

Expected Response Package elements:
AudioElement
Command Code: 9 AddText
Parameter count: 2

| Parameter # | Data Type | Data |
|---|---|---|
| 0 | Int32 | PhotoID |
| 1 | String | Text annotation (keyword) |

Expected Response Package elements:
none
Command Code: 10 Refresh
Parameter count: 1

| Parameter # | Data Type | Data |
| --- | --- | --- |
| 0 | Int32 | PhotoID |

Expected Response Package elements:
PictureElement
Command Code: 11 GetInfo
Parameter count: 0
Expected Response Package elements:
PictureElement (picture contains collection information rendered as a bitmap)
Command Code: 12 GetIndex
Parameter count: 2

| Parameter # | Data Type | Data |
| --- | --- | --- |
| 0 | Int32 | Start Index # |
| 1 | Int32 | # of items per page |

Expected Response Package elements:
First package: IndexinfoElement
$2^{nd}$-$n^{th}$ package: IndexitemElement (n=lesser of (# of items per page requested or size of result set))
Final package will contain "FinalSegment" flag set
Command Code: 13 BrowseByThumbnails
Parameter count: 2

| Parameter # | Data Type | Data |
| --- | --- | --- |
| 0 | Int32 | Starting index # (into keyword list) |
| 1 | Int32 | # of items per page |

Expected Response Package elements:
$1^{st}$ package: IndexinfoElement
$2^{nd}$-$n^{th}$ packages: IndexItemElement
Final package will have "FinalSegment" flag set
Command Code: 14 GetZoomedImage
Parameter count: 4

| Parameter # | Data Type | Data |
| --- | --- | --- |
| 0 | Int32 | PhotoID |
| 1 | Float | Zoom Center X |
| 2 | Float | Zoom Center Y |
| 3 | Int32 | Zoom Level (as %) |

Expected Response Package elements:
PhotoDataElement
PictureElement
Command Code: 15 SendToDisplay
Parameter count: 2 or 5

| Parameter # | Data Type | Data |
| --- | --- | --- |
| 0 | Int32 | PhotoID |
| 1 | String | Display Device Name |
| 2 (optional) | Float | Zoom Center X |
| 3 (optional) | Float | Zoom Center Y |
| 4 (optional) | Int32 | Zoom Level (as %) |

Expected Response Package elements:
none
Command Code: 16 GetDisplayList
Parameter count: 0
Expected Response Package elements:
None (not currently implemented)
Command Code: 17 EmailItem
Parameter count: 6

| Parameter # | Data Type | Data |
| --- | --- | --- |
| 0 | Int32 | PhotoID |
| 1 | String | Recipient(s) address(es) |
| 2 | Int32 | Picture Scale (as %) |
| 3 | Int32 | Item voice annotation flag |
| 4 | String | Message body |
| 5 | Byte array | WAV audio data for this message |

Expected Response Package elements:
none
Command Code: 18 SetName
Parameter count: 1

| Parameter # | Data Type | Data |
| --- | --- | --- |
| 0 | String | Device name (client) |

Expected Response Package elements:
none
Command Code: 19 SetKeywordThumbnail
Parameter count: 2

| Parameter # | Data Type | Data |
| --- | --- | --- |
| 0 | Int32 | PhotoID |
| 1 | String | Keyword |

Expected Response Package elements:
none
Command Code: 20 BrowseByMonth
Parameter count: 1

| Parameter # | Data Type | Data |
| --- | --- | --- |
| 0 | Int32 | Year |

Expected Response Package elements:
1st Package: IndexInfoElement
2nd-13th package: IndexItemElement
Command Code: 21 KeepAlive
Parameter count: 0
Expected Response Package elements:
none
Command Code: 22 UploadFile
Parameter count: 2

| Parameter # | Data Type | Data |
|---|---|---|
| 0 | String | Filename |
| 1 | Byte array | Contents of file |

Expected Response Package elements:
none
Command Code: 23 GetThumbnail
Parameter count: 0
Expected Response Package elements:
None (not implemented)
Command Code: 24 PlayVideo
Parameter count: 2

| Parameter # | Data Type | Data |
|---|---|---|
| 0 | Int32 | ItemID |
| 1 | Int32 | Data Rate Hint (bps) |

Expected Response Package elements:
VideoLinkElement
Command Code: 25 GetUserList
Parameter count: 0
Expected Response Package elements:
ServerMessageElement (multiple)
Command Code: 26 CreateUser
Parameter count: 4

| Parameter # | Data Type | Data |
|---|---|---|
| 0 | String | UserID |
| 1 | String | Password Hash |
| 2 | Bool | Admin flag |
| 3 | String | Default keyword |

Expected Response Package elements:
none
Command Code: 27 DeleteUser
Parameter count: 1

| Parameter # | Data Type | Data |
|---|---|---|
| 0 | String | UserID |

Expected Response Package elements:
none
Command Code: 28 SetUserPassword
Parameter count: 2

| Parameter # | Data Type | Data |
|---|---|---|
| 0 | String | UserID |
| 1 | String | New password hash |

Expected Response Package elements:
none
Command Code: 29 GetUserPermissions
Parameter count: 1

| Parameter # | Data Type | Data |
|---|---|---|
| 0 | String | UserID |

Expected Response Package elements:
ServerMessageElement (multiple)
Command Code: 30 SetUserPermissions
Parameter count: 3

| Parameter # | Data Type | Data |
|---|---|---|
| 0 | String | UserID |
| 1 | Bool | Add/delete flag (T = Add) |
| 2 | String | Keyword |

Expected Response Package elements:
none
Command Code: 31 SendInvitation
Parameter count: 2

| Parameter # | Data Type | Data |
|---|---|---|
| 0 | String | Email address of invitee |
| 1 | String | Connect as UserID |

Expected Response Package elements:
none
Command Code: 32 RemoveKeyword
Parameter count: 2

| Parameter # | Data Type | Data |
|---|---|---|
| 0 | Int32 | PhotoID |
| 1 | String | Keyword |

Expected Response Package elements:
none
Response Protocol Description
Responses from the server are in the form of Response Packages. A Response Package has a fixed size header, followed by an optional payload of varying size. The payload will contain 1 or more Response Elements of specific types. Response Elements may include strings in their data—strings are always encoded as a 4 byte length prefix followed by the ascii string data.

Response Header Structure:

| Byte # | Length (bytes) | Data |
|---|---|---|
| 0 | 4 | Package length (bytes) |
| 4 | 4 | HeaderID (0xf005ba11) |
| 8 | 4 | Response Flags |
| 12 | 4 | SequenceID |
| 16 | 4 | Segment |
| 20 | 4 | Response Element count |

Response flags are a bitmask of the following values:
FinalSegment=1,
Reset=2,
ServerPush=4,
Error=8

Each Response Element follows, with the following format:

Response Element Types:

| 0 | PhotoDataBlock |
|---|---|
| 1 | Picture |
| 2 | MetaDataItemList |
| 3 | IndexItem |
| 4 | AudioStream |
| 5 | NavigationData |
| 6 | IndexInfo |
| 7 | VideoLink |
| 8 | ServerMessage |
| 9 | CollectionInfo |

Response Element Structure:

| Byte # | Length (bytes) | Data |
|---|---|---|
| 0 | 1 | Response Element TypeID |
| 1 | Varies | Response Element Data |

Response Element Definitions:

Response Element Type: 0 PhotoDataBlock

| Byte # | Length (bytes) | Data Type | Data |
|---|---|---|---|
| 0 | 4 | Int32 | 40 (size of remaining data) |
| 4 | 4 | Int32 | PhotoID |
| 8 | 4 | Uint32 | Flags |
| 12 | 2 | Ushort | Original Width |
| 14 | 2 | Ushort | Original Height |
| 16 | 4 | Float | Zoom Center X |
| 20 | 4 | Float | Zoom Center Y |
| 24 | 2 | Ushort | Zoom Level |
| 26 | 2 | Short | Rating |
| 28 | 8 | DateTime | Date Picture Taken |
| 36 | 4 | Uint | Index # (in result set) |
| 40 | 4 | Uint | Result set size |

Response Element Type: 1 Picture

| Byte # | Length (bytes) | Data Type | Data |
|---|---|---|---|
| 0 | 4 | Int32 | PhotoID |
| 4 | 4 | Int32 | Photo byte stream length |
| 8 | Varies | Byte array | Jpeg byte stream |

Response Element Type: 2 MetaDataItemList

| Byte # | Length (bytes) | Data Type | Data |
|---|---|---|---|
| 0 | 1 | Bool | Global List flag |
| 1 | 4 | Int32 | # of Meta Data Items to follow |

Followed by 1 or more of MetaDataItem(s):

| Data type | Data | |
|---|---|---|
| Byte | Meta Data Type | 0 = Keyword, 1 = Exif Data, 2 = Other |
| String | Label | |
| String | Action Code | |
| string | Query Type | |
| String | Query Param | |

Response Element Type: 3 IndexItem

| Byte # | Length (bytes) | Data Type | Data |
|---|---|---|---|
| 0 | 4 | Int32 | ItemID |
| 4 | Varies | String | Label |
| | | String | Action Code |
| | | String | Query Type |
| | | String | Query Param |
| | | String | Index Type |
| | | String | IndexPreviousItem |
| | | String | IndexNextItem |
| | 4 | Int32 | Length of thumbnail image data (bytes) |
| | Varies | Byte array | Thumbnail image jpeg byte data |

Response Element Type: 4 AudioStream

| Byte # | Length (bytes) | Data Type | Data |
|---|---|---|---|
| 0 | 4 | Int32 | Audio data length |
| 4 | Varies | Byte array | WAV audio data bytes |

Response Element Type: 5 NavigationData

| Byte # | Length (bytes) | Data Type | Data |
|---|---|---|---|
| 0 | 4 | Int32 | Current Index (in result set) |
| 4 | 4 | Int32 | Total Count (of result set) |

Response Element Type: 6 IndexInfo

| Byte # | Length (bytes) | Data Type | Data |
|---|---|---|---|
| 0 | 1 | Byte | IndexType<br>0 = Query Result Set<br>1 = Keyword Thumbnails<br>2 = Month Thumbnails |
| 1 | 4 | Int32 | Page Index |
| 5 | 4 | Int32 | Page Item count |
| 9 | 4 | Int32 | Total Item count |
| 13 | Varies | String | Forward Key |
|  | Varies | String | Backward Key |
|  | Varies | String | Label |

Response Element Type: 7 VideoLink

| Byte # | Length (bytes) | Data Type | Data |
|---|---|---|---|
| 0 | 4 | Int32 | Video TCP Port # (for WME b'cast stream) |

Response Element Type: 8 ServerMessage

| Byte # | Length (bytes) | Data Type | Data |
|---|---|---|---|
| 0 | Varies | String | Server message text |

Response Element Type: 9 CollectionInfo

| Byte # | Length (bytes) | Data Type | Data |
|---|---|---|---|
| 0 | Varies | String | Collection Name |
|  | Varies | String | Collection Owner |
|  | Varies | String | Server Version |
|  | Varies | String | Protocol Version |
|  | 4 | Int32 | Collection Size |
|  | 4 | Int32 | Keyword Count |

Exemplary Operating Environment

Figure 5:
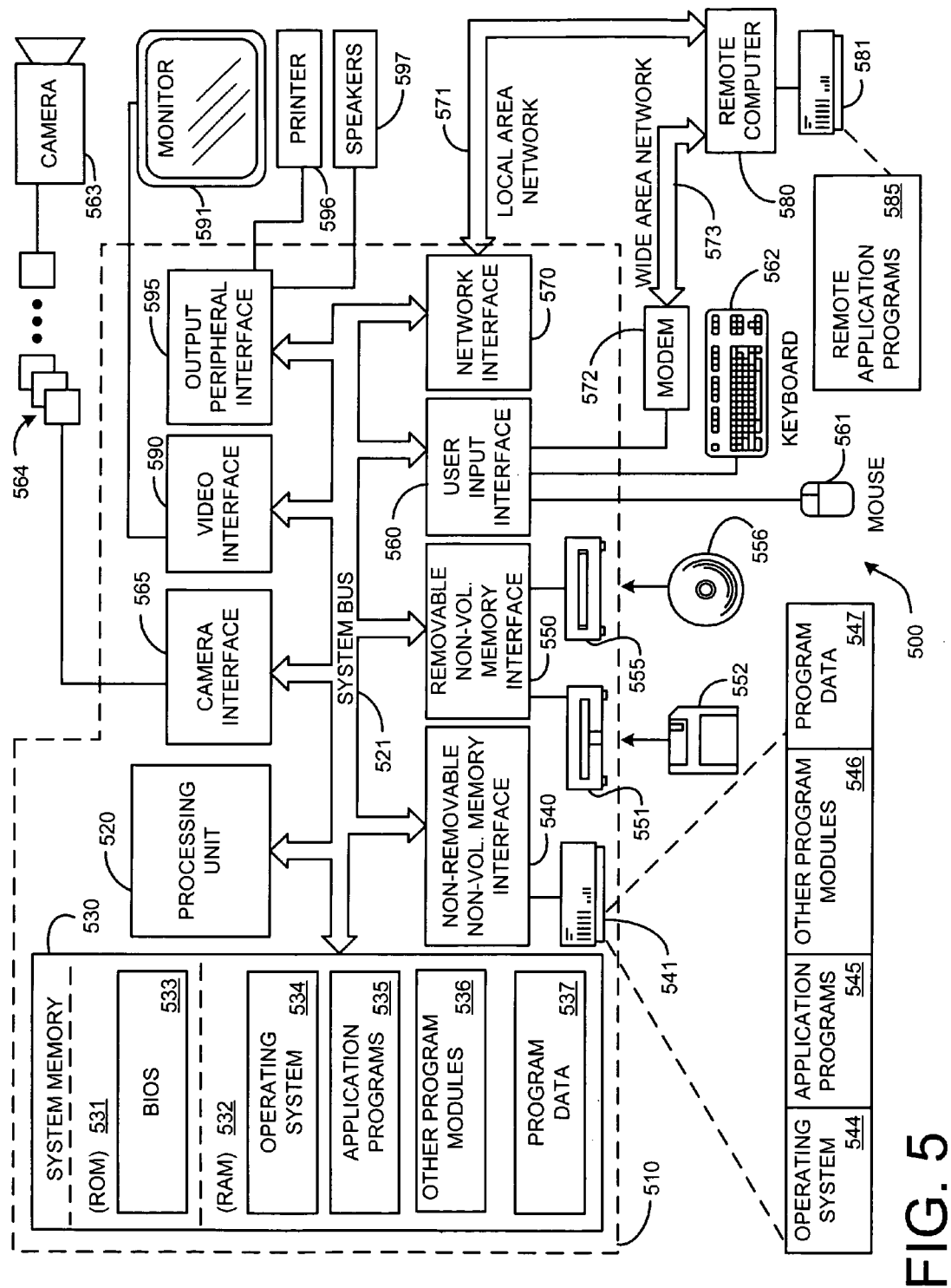
FIG. 5 is a block diagram depicting an exemplary general purpose computing device that may be used in conjunction with one or more described techniques and/or systems.

FIG. 5 is a block diagram depicting a general purpose computing environment 500 that may be used in one or more implementations according to the present description. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-movable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595. Of particular significance to the present invention, a camera 563 (such as a digital/electronic still or video camera, or film/photographic scanner) capable of capturing a sequence of images 564 can also be included as an input device to the personal computer 510. Further, while just one camera is depicted, multiple cameras could be included as an input device to the personal computer 510. The images 564 from the one or more cameras are input into the computer 510 via an appropriate camera interface 565. This interface 565 is connected to the system bus 521, thereby allowing the images to be routed to and stored in the RAM 532, or one of the other data storage devices associated with the computer 510. However, it is noted that image data can be input into the computer 510 from any of the aforementioned computer-readable media as well, without requiring the use of the camera 563.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Conclusion

While one or more exemplary implementations have been illustrated and described, it will be appreciated that various changes can be made therein without departing from the spirit and scope of the claims appended hereto.

The invention claimed is:

1. A mobile electronic device for processing electronic files stored on a base computing device using voice commands, comprising:

memory;

data transmission means;

a microphone;

an application stored in the memory, the application being configured to:

establish a data connection with the base computing device over a mobile network via the data transmission means;

in response to receiving at least one individual voice command via the microphone, manipulate at least one electronic file stored on the base computing device; and wherein the application is configured to manipulate the at least one electronic file and to command the base computing device to transmit by one or both of:

providing one or both of: the individual voice command or at least one other individual voice command received via the microphone to the base computing device as one or more audio notes; or providing one or more query requests that include translated text from the at least one individual voice command or the at least one other individual voice command to the base computing device for subsequent processing and wherein the at least one electronic file or at least one other electronic file comprise at least one digital image file, video file, or electronic presentation file, wherein the one or more audio notes or the translated text comprise a keyword from the individual voice command, and wherein the keyword is used to identify the at least one electronic file or the at least one other electronic file;

sending image resolution data from the mobile electronic device;

wherein the image resolution data is configured to cause resolution adjustment on the base computing device of at least one of the at least one digital image file or another digital image file of a plurality of locally stored digital image files.

2. The mobile electronic device as recited in claim 1, wherein to manipulate the at least one electronic file comprises to browse a database of the at least one electronic file on the base computing device.

3. The mobile electronic device as recited in claim 1, wherein to manipulate the least one electronic file comprises to add an annotation to the at least one of electronic file.

4. The mobile electronic device as recited in claim 1, further comprising a speech recognition module configured to receive one or both of the at least one individual voice command or the at least one other individual voice command and perform speech-to-text translation.

5. The mobile electronic device as recited in claim 1, wherein the data connection means is configured to establish a data connection with the base computing device via the Internet.

6. One or more computer-readable storage media containing executable instructions that, when executed, implement the following steps:

establishing communication with a base computing device;

during the communication:

receiving, on a mobile electronic device, a voice command, wherein the mobile electronic device is separate from the base computing device;

causing the base computing device to perform at least a portion of processing associated with the voice command, wherein to perform at least a portion of the processing comprises performing speech-to-text translation on the voice command to provide translated text that includes a keyword;

manipulating in real time one or more electronic files stored on the base computing device in response to the voice command, wherein the manipulating comprises selection of an individual electronic file of the one or more electronic files stored on the base computing device based at least in part on the keyword, wherein the electronic files comprise digital photo image files;

directing, from the mobile electronic device and in real time a presentation of the one or more electronic files by the base computing device, and wherein the directing is performed based at least in part on one or both of the voice command or at least one other voice command received on the mobile electronic device; and sending image resolution data from the mobile electronic device to the base computing device that is configured to cause the base computing device to adjust a resolution of at least one of the at least one digital image file or another digital image file of a plurality of locally stored digital image files.

7. The one or more computer-readable storage media as recited in claim 6, wherein the manipulating further comprises browsing the one or more electronic files.

8. The one or more computer-readable storage media as recited in claim 6, wherein the electronic files comprise electronic presentation files.

9. The one or more computer-readable storage media as recited in claim 6, wherein the establishing communication further comprises establishing a communication link through a mobile communication network.

10. The one or more computer-readable storage media recited in claim 6, wherein the electronic device comprises the one or more computer-readable storage media.

11. One or more computer-readable storage media as recited in claim 6, wherein the presentation is achieved on a remote display device that is separate from the mobile electronic device.

12. A method for processing one or more electronic files stored on a base computing device from a mobile electronic device, comprising:

establishing communication with the base computing device;

during the communication:

receiving, on the mobile electronic device, a voice command, wherein the mobile electronic device is separate from the base computing device;

causing the base computing device to perform at least a portion of processing associated with the voice command, wherein to perform at least a portion of the processing comprises performing speech-to-text translation on the voice command to provide translated text that includes a keyword;

wherein the at least a portion of the processing includes manipulating in real time the one or more electronic files stored on the base computing device in response to the voice command, wherein the manipulating comprises selection of an individual electronic file of the one or more electronic files stored on the base computing device based at least in part on the keyword, wherein the electronic files comprise digital photo image files;

directing display of at least a portion of the one or more electronic files, and wherein the directing is performed based at least in part on one or both of the voice command or at least one other voice command received on the mobile electronic device; and, sending image resolution data from the mobile electronic device to the base computing device that is configured to cause the base computing device to adjust a resolution of at least one individual electronic file of the one or more electronic files.

13. The method as recited in claim 12, wherein establishing the communication session comprises receiving a request from the mobile electronic device to establish the communication session over a mobile network.

14. The method as recited in claim 12, wherein receiving the one or more voice commands comprises receiving a command to browse at least a portion of the one or more digital photo image files.

15. The method as recited in claim 12, wherein the receiving the voice command comprises receiving a command to edit an annotation associated with the individual digital photo image file.

16. The method as recited in claim 12, wherein the directing display causes display of the at least a portion on a display device that is remote from the base computing device.

* * * * *